L. G. LAUTZENHISER & C. P. CHANDLER.
APPARATUS FOR PURIFICATION OF SEWAGE AND OTHER WATERS.
APPLICATION FILED AUG. 20, 1908. RENEWED JUNE 18, 1910.
966,025.
Patented Aug. 2, 1910.
2 SHEETS—SHEET 1.
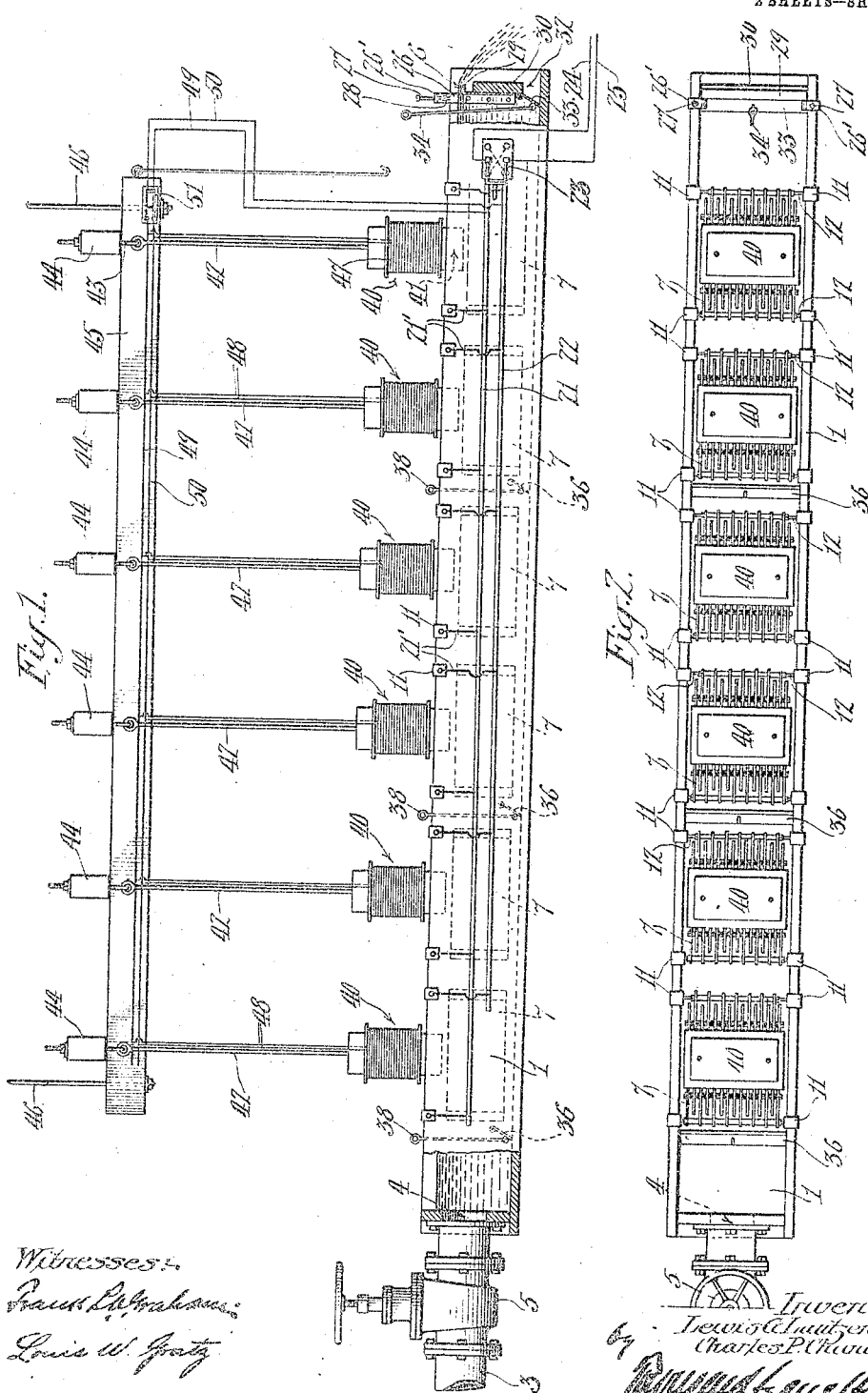

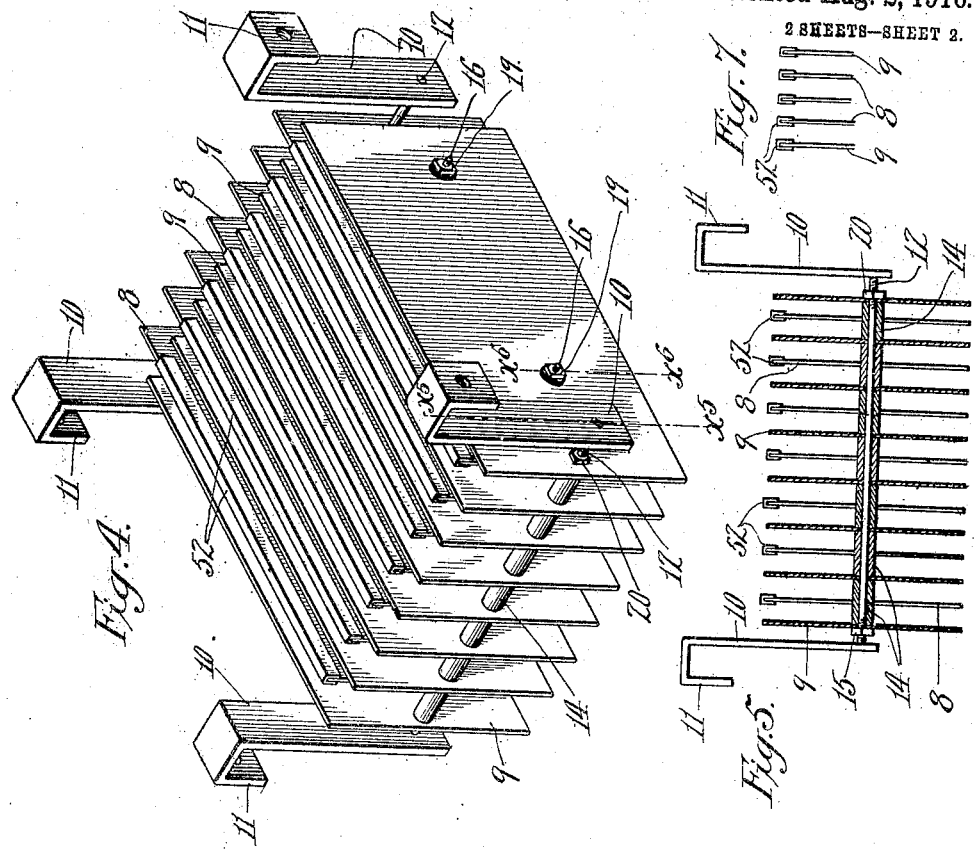

UNITED STATES PATENT OFFICE.

LEWIS G. LAUTZENHISER AND CHARLES P. CHANDLER, OF LOS ANGELES, CALIFORNIA, ASSIGNORS OF ONE-HALF TO DE WITT A. SLEMMER AND SHIRLEY C. WARD, AND SAID CHANDLER ASSIGNOR OF ONE-TWENTIETH TO W. K. REESE, JR., ALL OF LOS ANGELES, CALIFORNIA.

APPARATUS FOR PURIFICATION OF SEWAGE AND OTHER WATERS.

966,025.   Specification of Letters Patent.   Patented Aug. 2, 1910.

Application filed August 20, 1908, Serial No. 449,552. Renewed June 18, 1910. Serial No. 567,704.

*To all whom it may concern:*

Be it known that we, LEWIS G. LAUTZENHISER and CHARLES P. CHANDLER, both citizens of the United States, residing at Los Angeles, in the county of Los Angeles and State of California, have invented a new and useful Apparatus for Purification of Sewage and other Waters, of which the following is a specification.

The main object of the present invention is to provide for deodorization and purification of sewage in such manner that it will be rendered unobjectionable in smell and free from dangerous organic and other impurities.

A further object of the invention is to provide means for treating the sewage continuously, whereby a large capacity is secured in a comparatively small apparatus without the use of extensive settling tanks, etc.

The invention is based on the use of electrolysis in connection with electrodes of such nature as to form metallic precipitates capable of collecting and deodorizing organic matter present.

In this connection one of the objects of the invention is to provide means whereby the electrodes may be used continuously, or substantially so, without material interruption due to clogging or fouling thereof.

Another object of the invention is to provide efficient and cheap means for support and insulation of the electrodes.

Another object of the invention is to provide efficient and simple means for controlling the flow of fluid between the electrodes.

Another object of the invention is to provide convenient means for flushing or clearing out the flume when required.

In connection with the electrolysis, magnetic action may be utilized, to increase the efficiency of the precipitate etc., when desired. In this connection, the invention comprises improved means for supporting the magnets.

In the accompanying drawings:—Figure 1 is a side elevation of the apparatus, partly in section. Fig. 2 is a plan thereof. Fig. 3 is a vertical section. Fig. 4 is a perspective of a set of electrodes. Fig. 5 is a vertical section on the line $x^5$—$x^5$ in Fig. 4, showing the manner of supporting and establishing circuit connection to the electrodes. Fig. 6 is a fragmentary section on the line $x^6$—$x^6$ of Fig. 4, showing the manner of electrically insulating, but mechanically connecting, the electrodes at a portion thereof removed from the point of support. Fig. 7 is a partial section of the electrodes, showing a modification.

The apparatus comprises a flume or trough 1 formed, for example, of wood, with flat bottom and vertical sides, a sewer supply main or pipe 3 communicating through an inlet 4 into the upper end of this flume, said pipe 3 having a gate or valve 5 for controlling a supply of sewage, a weir 6 at the lower end of the flume 4 controlling the outflow and backing up the fluid into the flume to any desired level, and a plurality of sets 7 of electrodes extending in planes parallel to the length of the flume to allow the water to flow freely between them. The bottom of the flume is smooth, continuous and imperforate, so as not to offer any obstruction to the flow of sewage, or to collect any solid matter.

Each set 7 of electrodes comprises a plurality of anodes 8 and a plurality of cathodes 9, the anodes and cathodes being arranged alternately and being supported rigidly in parallel planes and at a suitable distance apart by supporting, connecting and insulating means as hereinafter described. Each set of electrodes is supported on four hangers 10, each hanger formed with a lateral projection or hook 11 at its upper end to extend over and rest on the top of the side boards of tank 1, and the vertical leg of the hanger extending down on the inside of said side board. A bolt 12 extends across between the two hangers at one end of said electrodes and screws into said hangers so as to connect the hangers as a pair, the anodes being all strung and supported on the bolt 12 at one end and the cathodes being all strung and supported on the bolt 12 at the other end, and the electrodes being in each case spaced apart by conducting bushings 14 and held rigidly in position by nuts 15 on the outside of the two outer electrode plates. Intermediate the two supporting and connecting bolts 12 are provided two supporting and insulating bolts 16, each extending through all of the electrodes and each surrounded by an insulating tube 17 passing through all the electrodes, and insulating bushings 18 being provided on and around said tube to space apart the electrodes. The set of electrodes is assembled as follows:—Two bolts 12 with nuts 15 thereon are screwed into the two hangers 10, and one electrode, say an anode, is slipped over said two bolts, the two bolts 16 being passed through said anode and insulated therefrom by the sleeve or tube 17, two nuts 19 on the bolts 16 being pressed against the outer side of the anode, and the anode being pressed against the nuts 15 on the bolt 12 at one end, said anode being, however, not of sufficient length to reach to the bolt 12 at the other end. A metal bushing 14 is slipped on the first named bolt 12 against the inner face of the anode, and insulating bushings 18 are slipped on the tube 17 against the anode. A cathode is next put in place by slipping onto the bolt 12 at the outer end, pressing it home against the bushings aforesaid, the cathode not being long enough to reach to the bolt at the first named end. Another set of bushings is then slipped on, followed by another anode and so forth, until the set of electrodes is completed, whereupon fastening nuts 20 are screwed into place at the other end, and the other hangers 10 are screwed onto the said other ends of the bolts 12. The set so built up can be deposited as a rigid member bodily into the flume and allowed to rest by its hooks 11 on the side walls of the flume.

The electrodes 8 and 9 are preferably of iron, both anodes and cathodes, and it is preferred to use cast-iron for this purpose. In the operation of the apparatus it is found that the edges of the electrodes, particularly the upper edges thereof, are subject to abnormal corrosion. To do away with this local corrosion, and for other reasons hereinafter set forth, the upper edge of each anode is preferably provided with a protecting strip 52 of copper, bent in channel shape and clenched, brazed, soldered or otherwise fastened to the anode. This copper strip presents, in relation to the iron of the anode, a polarity which is the reverse to that of the operating electric current, and thereby reduces the intensity of electrolytic action along this edge, and in so far as it is corroded by the electrolytic action it supplies to the sewage fluid a small proportion of copper salt which is effective as a deodorizer and disinfectant.

The respective positive and negative hangers and connectors 10 are connected by branch wires 21' to bus bars or leads 21, 22 connected through a reversing switch 23 with supply wires 24, 25 for the supply of direct current of low tension. The connection of the wires 21' is made directly to the hooks 11 of the hangers.

The weir 6 at the lower end of the flume preferably consists of a vertical plate attached to side bars 26 having at their upper ends outwardly turned lugs 26', through which pass supporting bolts 27 carrying nuts 28 for adjustment of the height of the weir. Said weir has a lip 29 at its upper end and rests against a cross board 30 extending transversely of the flume. Said board 30 is preferably separated from the bottom of the flume to leave a flushing discharge outlet 32 normally closed by a gate 33 hinged to the cross board 30 and extending downwardly and rearwardly from the flume, so that pressure of the water tends to hold the gate closed, said gate being provided with an operating handle 34 extending upwardly into convenient position for lifting the gate when it is desired to flush out the flume. Any desired number of baffles 36 may be provided, hinged to the sides of the flume and extending downwardly and rearwardly, directly at the rear of one or more of the sets of electrodes, each baffle plate having an operating handle 38 extending up into convenient position for use. When the baffle plate is down in the position shown in Fig. 1, it deflects the current of water upwardly so as to force the same to pass between the next set of electrodes. When the baffle plate is raised a free passage is provided for the water below the electrodes.

In using magnetic action at the electrodes, means are provided for supporting the magnets without undue strain on the flume. A magnet indicated at 40 is provided for each set of electrodes with its pole pieces 41 extending in proximity to the upper edge of the electrodes, and each of said magnets is hung by eye bolts 42 from hooks 43 in one of the cross beams 44 supported by a stringer 45, which may be hung by means, indicated at 46, from a roof or other support, independently of the electrode flume. This construction not only relieves the flume from strain, but leaves the space around and above the electrodes clear, for inspection of, and access to, the electrodes. The coils 47 of the respective magnets 40 are supplied by branch wires 48 from the leads 49, 50 including a switch 51 and connected to bus bars 21, 22.

The operation is as follows:—The sewage is turned into the flume 1 by opening valve 5, and the weir 6 at the lower end of the flume is adjusted to back-up the sewage in the flume to a level sufficient to submerge all of the electrodes, the flushing gate 33 being closed and the baffle plates 36 being also in closed position. The sewage then passes longitudinally through the flume and between the several sets of electrode plates. Current being turned on by closing reversing switch 23, it passes through the electrolyte in multiple circuits between the anodes and cathodes. The electrodes being of iron, the effect of the electrolysis is to produce in the fluid, salts of iron, which combining with the other substances present in the sewage form a bulky precipitate that has a property of gathering to itself or absorbing the various impurities in the water. Another effect of the electrolysis, particularly in conjunction with the effect of the iron salts produced, is to deodorize the sewage. It has been found possible by this means to effectually deodorize sewage amounting to 500,000 gallons in twenty-four hours by the operation of an apparatus consisting of one flume 22 inches wide by 18 inches deep and 30 feet long with an expenditure of 300 amperes under a pressure of 1.6 volts. The magnets 40 are for the purpose of modifying the quantity and quality of the electrolytic precipitate, thereby increasing the efficiency of the process. These magnets may, however, be omitted without departing from the main features of the invention. Sedimentary material accumulating in the bottom of the flume may be removed from time to time by raising the flushing gate 33, and the baffle plates 36 allowing the flume to be flushed out, and on then putting the baffle plates down and again directing the flow of water through the flume, the plates may be cleaned to some extent, but it is found in practice that an adherent deposit forms on the cathodes which is not removable by mere hydraulic action, and to effect removal of this deposit the present process provides for temporary reversal of the current from time to time by means of the reversing switch 23. After such a deposit has been formed the said reversing switch is thrown to reverse position, causing the current to pass into the electrolyte from the plate which has been acting as a cathode. A short treatment of the plate in this manner causes the deposit to be loosened therefrom and to be washed away with the current of water, whereupon the reversing switch is restored to the normal position.

The strip or cap 20 may be of any metal different from the metal of the electrode, for example, of copper, aluminum, zinc, etc., according to the requirements of the liquid. Said caps may be provided on either anode or cathode or on both anode and cathode, as shown in Fig. 7.

What we claim is:—

1. An apparatus for the deodorization of sewage, comprising a flume having a smooth, continuous, imperforate bottom, a plurality of sets of electrodes supported in said flume, said electrodes extending in planes parallel to the length of the flume, means for supplying sewage at one end of said flume, a regulatable weir at the other end of said flume for discharging the fluid and controlling the level of the fluid in the flume, and a discharge gate located beneath the weir and between the weir and the bottom of the flume for emptying the flume, said discharge gate being normally held closed by the pressure of the water and being provided with manual operating means to open the same.

2. An apparatus for the deodorization of sewage, comprising a flume having a smooth, continuous, imperforate bottom, a plurality of sets of electrodes supported in said flume, said electrodes extending in planes parallel to the length of the flume, means for supplying sewage at one end of said flume, a cross board extending transversely of the other end of the flume and separated from the bottom of the flume to form a discharge outlet between said board and the bottom of the flume, a weir adjacent to said board and adjustable vertically to control the level of the sewage in the flume and the normal discharge from the flume, a discharge gate hinged to said cross board and extending downwardly therefrom to the bottom of the flume to normally close the said discharge outlet, and manual operating means for opening said discharge gate.

3. An electrode for treatment of sewage comprising a cast-iron plate having a copper cap.

4. In an apparatus for treatment of sewage, a set of electrodes comprising cathodes and anodes both formed of cast-iron, one of said electrodes being provided with an electrode portion consisting of copper in contact with the iron.

5. In an apparatus for the treatment of sewage, an electrode plate consisting of iron with a strip of copper secured along one edge thereof.

6. The combination with a flume, of a set of electrodes comprising two end bolts and two intermediate bolts, anodes strung on one end bolt and the two intermediate bolts, cathodes strung on the other end bolt and the two intermediate bolts, bushings on the end bolts between the electrodes, insulating sleeves around the intermediate bolts, insulating bushings on said sleeves separating the electrodes, nuts on the bolts, clamping the parts together, and hangers connected to said end bolts and provided with lateral projections to rest on the side walls of the flume for suspending the set and conveying current thereto.

7. In an apparatus for treatment of sewage, the combination with a flume provided with means for receiving sewage at one end and for discharging sewage at the other end, of electrodes supported in the flume and
5 comprising a cast iron electrode plate provided with a strip of copper secured along one edge thereof.

In testimony whereof, we have hereunto set our hands at Los Angeles, California this 13th day of August 1908.

LEWIS G. LAUTZENHISER.
CHARLES P. CHANDLER.

In presence of—
A. P. KNIGHT,
FRANK L. A. GRAHAM.